US012620129B2

(12) United States Patent
Halmetschlager-Funek et al.

(10) Patent No.: US 12,620,129 B2
(45) Date of Patent: May 5, 2026

(54) POSE QUANTIZATION-BASED KEYFRAME PRUNING FOR SIMULTANEOUS LOCALIZATION AND MAPPING

(71) Applicant: Snap Inc., Santa Monica, CA (US)

(72) Inventors: Georg Halmetschlager-Funek, Vienna (AT); Nikolaj Kuntner, Vienna (AT); Simon Schreiberhuber, Vienna (AT)

(73) Assignee: SNAP INC, Santa Monica, CA (US)

( * ) Notice: Subject to any disclaimer, the term of this patent is extended or adjusted under 35 U.S.C. 154(b) by 170 days.

(21) Appl. No.: 18/670,573

(22) Filed: May 21, 2024

(65) Prior Publication Data

US 2025/0363657 A1 Nov. 27, 2025

(51) Int. Cl.
| | |
|---|---|
| *G06T 7/00* | (2017.01) |
| *G06F 3/01* | (2006.01) |
| *G06T 7/73* | (2017.01) |

(52) U.S. Cl.
CPC ............... *G06T 7/73* (2017.01); *G06F 3/012* (2013.01)

(58) Field of Classification Search
None
See application file for complete search history.

(56) References Cited

U.S. PATENT DOCUMENTS

| | | | | | |
|---|---|---|---|---|---|
| 5,956,026 | A | * | 9/1999 | Ratakonda | ............. G11B 27/28 715/767 |
| 7,460,178 | B2 | * | 12/2008 | Kondo | ................. H04N 21/485 348/576 |

| | | | | | |
|---|---|---|---|---|---|
| 11,182,614 | B2 | * | 11/2021 | Sharma | .................. G06V 20/20 |
| 2007/0031062 | A1 | * | 2/2007 | Pal | ......................... H04N 23/698 382/284 |
| 2013/0076915 | A1 | * | 3/2013 | Ramachandran | ....... G06T 7/207 348/207.1 |

(Continued)

FOREIGN PATENT DOCUMENTS

WO 2022055582 3/2022

OTHER PUBLICATIONS

"International Application Serial No. PCT US2025 030128, Written Opinion mailed Sep. 4, 2025", 4 pgs.

(Continued)

*Primary Examiner* — Martin Mushambo
(74) *Attorney, Agent, or Firm* — SCHWEGMAN LUNDBERG & WOESSNER, P.A.

(57) ABSTRACT

Embodiments of the present invention relate to techniques for managing keyframe data in a Simultaneous Localization and Mapping (SLAM) system of an Augmented Reality (AR) device. The method involves obtaining a plurality of keyframes, each linked to pose data comprising spatial and orientation data derived from raw data captured by sensors. The pose data for each keyframe is quantized according to predefined parameters, creating a structured pose grid of quantized cells. The technique includes analyzing the quantized pose data to identify excess keyframes that exceed a predetermined threshold within these cells. Redundant keyframes are pruned from memory, optimizing the SLAM system's efficiency by reducing computational load and memory usage. This selective pruning process ensures that the AR device retains a comprehensive and accurate environmental map while operating within the constraints of limited system resources.

20 Claims, 7 Drawing Sheets

(56) References Cited

U.S. PATENT DOCUMENTS

| | | | |
|---|---|---|---|
| 2014/0119598 A1* | 5/2014 | Ramachandran .. | G01C 21/3863 |
| | | | 382/172 |
| 2014/0333741 A1* | 11/2014 | Roumeliotis .......... | G06T 7/246 |
| | | | 348/61 |
| 2016/0179830 A1* | 6/2016 | Schmalstieg ....... | G06F 16/2264 |
| | | | 707/722 |
| 2018/0082124 A1* | 3/2018 | Zhang .................... | G06V 20/46 |
| 2019/0026943 A1* | 1/2019 | Yan ......................... | G06T 7/344 |
| 2021/0247179 A1* | 8/2021 | Yelton ................... | G01S 17/894 |
| 2021/0247517 A1* | 8/2021 | Yelton .................... | G06V 20/64 |
| 2023/0154026 A1* | 5/2023 | Chang .................... | G06T 7/593 |
| | | | 382/154 |

OTHER PUBLICATIONS

"International Application Serial No. PCT US2025 030128, International Search Report mailed Sep. 4, 2025", 4 pgs.

Li, Wei, "KFS-LIO Key-Feature Selection for Lightweight Lidar Inertial Odometry", IEEE International Conference On Robotics And Automation ICRA, 5042-5048, May 30, 2021, 7 pgs.

Song, Shuai, "MF-LIO integrating multi-feature LiDAR inertial odometry with FPFH loop closure in SLAM", Measurement Science And Technology, IOP, Bristol, GB, vol. 35, No. 8, May 14, 2024, 10 pgs.

* cited by examiner

750

700

752

MESSAGES

SOFTWARE ARCHITECTURE 704

APPLICATIONS 706

HOME 736

LOCATION 742

CONTACTS 730

MEDIA 744

THIRD-PARTY
APPLICATIONS 740

BROWSER 732

MESSAGING 746

BOOK READER 734

GAME 748

FRAMEWORKS 710

LIBRARIES 708

SYSTEM 718

API 724

OTHER 728

OPERATING SYSTEM 712

KERNEL 714

SERVICES 716

DRIVERS 722

MACHINE 702

PROCESSOR(S) 720

MEMORY 726

I/O COMPONENTS
738

POSE QUANTIZATION-BASED KEYFRAME PRUNING FOR SIMULTANEOUS LOCALIZATION AND MAPPING

TECHNICAL FIELD

The present application pertains to the field of augmented reality (AR) and mixed-reality devices. More specifically, the subject matter of the present application relates to a technique for enhancing the efficiency of Simultaneous Localization and Mapping (SLAM) algorithms and systems. This is achieved through a method of pose quantization-based keyframe pruning, which continuously refines the observed and stored keyframe data used by SLAM algorithms to map and interact with real-world environments.

BACKGROUND

Augmented reality (AR) and mixed-reality devices are designed to overlay digital content onto a real-world view of an environment or scene in a way that is interactive and contextually relevant. These devices operate by integrating a combination of camera systems and motion sensors to perceive and "understand" the real-world environment around them. The camera systems capture visual data, which can include images and videos of the surrounding area, while the motion sensors provide data on the device's movements and orientation in three-dimensional space.

The motion sensors typically include accelerometers, gyroscopes, and sometimes magnetometers. Accelerometers measure the rate of change of velocity with respect to time, allowing the device to detect linear acceleration along the X, Y, and Z axes. Gyroscopes measure the rate of rotation around the device's three physical axes, providing angular velocity data that helps determine orientation changes. Magnetometers, functioning as digital compasses, measure the strength and direction of the magnetic field, aiding in the determination of the device's heading relative to the Earth's magnetic North.

Together, these sensors feed data into a Simultaneous Localization and Mapping (SLAM) algorithm, which is a component for AR and mixed-reality systems. The SLAM algorithm enables the device to perform two essential functions concurrently: it localizes the device within the real-world environment by determining its position and orientation, and it maps the structure of the environment in real-time. This dual capability allows AR and mixed-reality devices to place digital objects in the physical world with accuracy and consistency, as the device understands both its own movement and the layout of the space around it.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
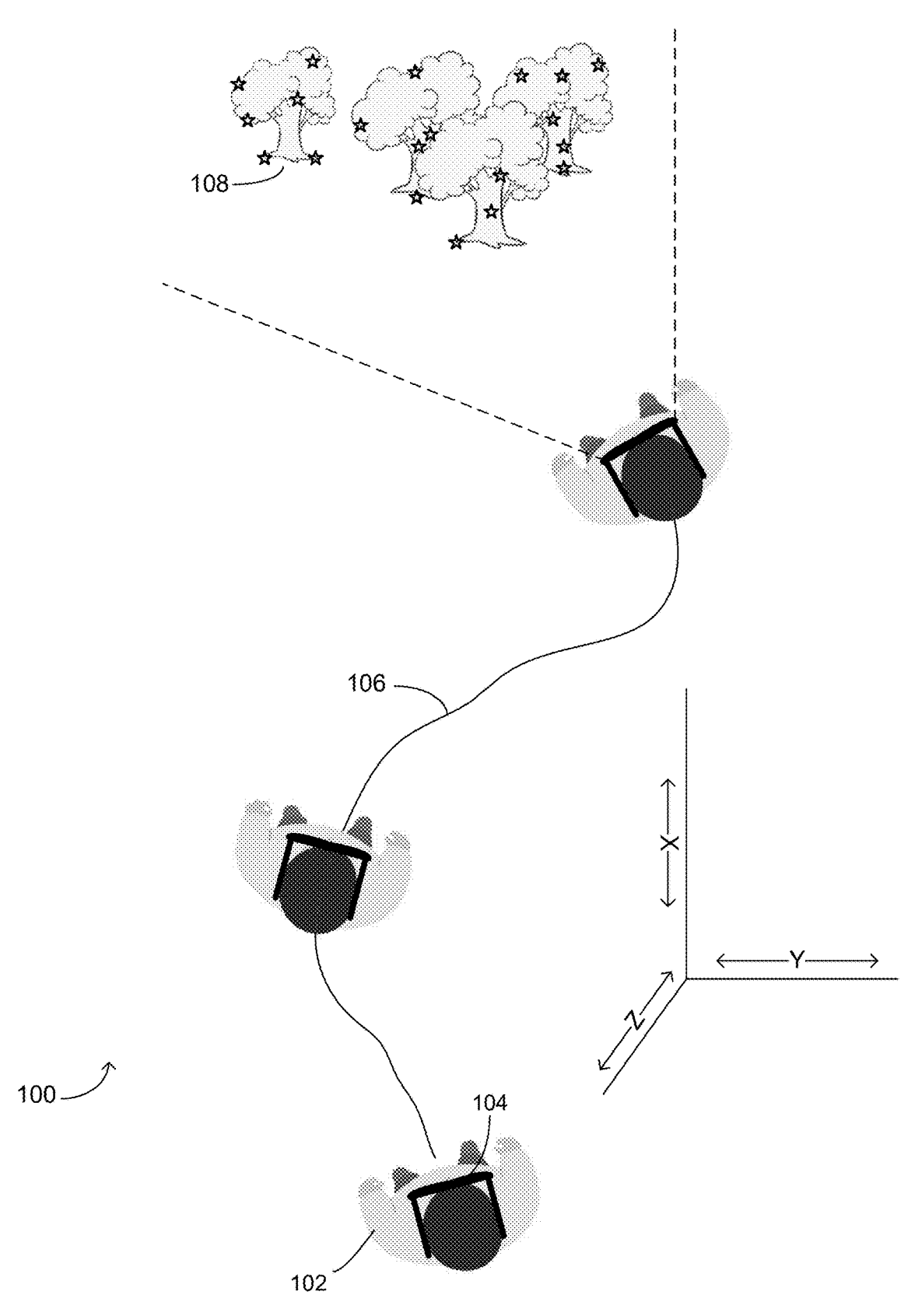
FIG. 1 is a diagram illustrating an example of an individual wearing an augmented reality (AR) device, in the specific form of AR glasses, consistent with an embodiment of the invention, while walking through a real-world environment dotted with trees, while subtly turning their head from side to side to engage with their surroundings.

Presented herein are techniques for enhancing the efficiency of Simultaneous Localization and Mapping (SLAM) algorithms used in augmented reality (AR) and mixed-reality devices. More specifically, described herein are techniques for the continuous pruning of data (e.g., keyframes) by employing pose quantization-based keyframe pruning, which significantly reduces the computational load and memory requirements of an AR device while maintaining the integrity of the environmental map. In the following description, for purposes of explanation, numerous specific details are set forth to provide a thorough understanding of the various aspects of different embodiments of the present invention. It will be evident, however, to one skilled in the art, that the present invention may be practiced without all of these specific details.

AR and mixed-reality devices enhance users' perception by superimposing digital content onto the real world, requiring an intricate fusion of camera systems and motion sensors to accurately interpret the surrounding environment. These devices utilize accelerometers for detecting linear acceleration, gyroscopes for measuring rotational movement, and occasionally magnetometers for ascertaining directional orientation relative to the Earth's magnetic field. The data from these sensors is synthesized by a SLAM algorithm or system, a component that enables the device to simultaneously determine its precise location and orientation within a space (localization) and construct a real-time map of the environment (mapping). This sophisticated interplay of sensors and SLAM algorithms enables AR and mixed-reality devices to seamlessly integrate virtual elements into the physical world, ensuring digital objects are placed accurately and consistently as the device navigates and interacts with its surroundings.

The camera system(s) and motion sensors on the device generate a wealth of data, which is processed to derive what is referred to as a frame. Each frame consists of an image captured by an individual camera of a camera system, combined with derived pose data that encapsulates the position and orientation—referred to as the pose—of the device at specific moments in time. This pose data is derived from sensor inputs such as accelerometers, gyroscopes, magnetometers, and image data, and includes the device's location, often expressed in Cartesian coordinates, and orientation data, which consists of the yaw (rotation around the vertical axis), pitch (tilt forward or backward), and roll (tilt side to side). This orientation data allows for determining the direction the device is facing and its attitude in space.

The image from each frame is analyzed to identify distinct features, such as edges, corners, or recognizable patterns, which are used in mapping the environment and aiding the device's localization within it. To enhance the efficiency of the SLAM algorithm, the device incorporates a mechanism to scrutinize these frames and select those that offer the most utility. For example, the selection may be based on various criteria including the clarity of image data, the distinctiveness of features, the number of features identified in an image, the positioning of the features within an image, the redundancy of information relative to other frames, and significantly, frames that represent or show motion, including a notable change in position or orientation. Frames that fulfill these selection criteria are designated as keyframes. These keyframes are important as they are processed by the SLAM algorithm and used to create and continuously refine a coherent and navigable map from the image data, thereby improving the device's interaction with its environment.

Beyond the fundamental pose and image data, in some examples, each keyframe may incorporate a range of supplementary data that enhances the richness of the data. This additional data complements the keyframe data by providing deeper context and detail. For instance, it may include information about the lighting conditions prevailing when the keyframe was captured, offering insights into the visual characteristics of the environment under varying light scenarios. Additional data elements associated with each keyframe might also encompass metadata such as camera settings, sensor readings from devices like accelerometers or gyroscopes, and contextual details like the presence of known Wi-Fi networks. Together, this comprehensive blend of pose, image, and supplementary data constitutes the keyframe data. The SLAM algorithm leverages this enriched dataset to construct and continually refine a coherent and navigable map, dynamically adapting as the AR device interacts with the real-world environment.

The ability of the SLAM algorithm or system to process and integrate data from both camera systems and motion sensors is what enables AR and mixed-reality devices to provide immersive and interactive experiences. However, the vast amount of data (e.g., keyframes) generated can pose challenges in terms of computational load and memory usage. Efficiently managing and pruning this keyframe data without losing critical information is key to the performance and viability of SLAM systems in AR and mixed-reality applications. Conventional techniques for memory management in SLAM algorithms are designed to address the challenges posed by the need to process and store large volumes of data generated by AR and mixed-reality devices. One such technique is the sliding window approach, which is frequently used to manage the computational load and memory usage. The sliding window technique involves maintaining a temporal window of the most recent keyframe data that the SLAM algorithm uses for processing. This window represents a subset of the entire keyframe data set, typically including only the latest keyframes. As new data is acquired, it enters the window, and the oldest data is discarded to keep the window size constant. The underlying presumption of this technique is that the most recent keyframe data is the most relevant for the current state of the device and its immediate surroundings, which may not always be accurate.

While the sliding window technique is effective in reducing memory demands by limiting the amount of keyframe data being processed, it is based on the assumption that newer keyframe data is inherently more valuable than older data. This assumption can be problematic for several reasons. Older keyframes may contain valuable information about the environment that is not present in the newer keyframe data. Discarding this data can lead to a loss of context and detail that could be beneficial for the SLAM algorithm, especially in large or complex environments where the device revisits previously mapped areas. By focusing only on recent keyframe data, the sliding window technique may introduce inconsistencies in the map. As the device moves through the environment, certain features or landmarks may be observed from different angles and distances. Older images could provide a more complete understanding of these features, contributing to a more accurate and stable map. Finally, the presumption that newer data is better does not account for situations where the quality of data may degrade over time due to factors such as sensor noise, changes in lighting conditions, or occlusions. In such cases, relying solely on the most recent data could lead to poorer performance of the SLAM algorithm.

As presented herein, consistent with some examples, an AR or mixed-reality device provides an improved approach to address the limitations of conventional memory management techniques in SLAM algorithms and enhance the efficiency of SLAM systems in AR and mixed-reality devices through a technique referred to herein as pose quantization-based keyframe pruning. This technique is designed to manage the keyframe data more effectively without compromising the quality and integrity of the environmental map. According to one aspect of the invention, pose data is quantized and organized according to a virtual pose grid, which involves discretizing the continuous pose space into a finite number of quantized cells or "bins". Each cell or bin of the pose grid represents a specific range of spatial and orientation data. As the SLAM algorithm collects and selects newly observed keyframe data, it assigns keyframes to these quantized cells based on their pose information. Then, for each cell or bin in the pose grid, the algorithm evaluates the keyframes and prunes those that are deemed redundant or less informative, retaining an overall reduced number of keyframes selectively chosen for their contribution to a robust and accurate map. This process significantly reduces the number of keyframes stored in memory while preserving higher quality keyframes, thereby decreasing the computational load and memory usage of the AR device without compromising the user experience.

Consistent with some embodiments, the advantages over prior techniques are manifold. Unlike the sliding window approach, which indiscriminately discards older keyframe data in favor of new data, the pose quantization-based keyframe pruning method ensures that valuable information is not lost. By evaluating keyframes within each quantized cell, the device can maintain a comprehensive representation of the environment, including data from various viewpoints and moments in time. This leads to a more consistent and reliable map, as the algorithm preserves keyframes that provide unique and significant information about the environment.

Furthermore, this technique is not biased towards recent data and does not assume that newer data is inherently better. It recognizes that the value of data depends on its content and contribution to the map's accuracy, not merely on its recency. This approach allows for more intelligent data management, which is particularly beneficial in dynamic environments where changes occur, or in scenarios where the device revisits previously mapped areas. The result is a SLAM system that is more efficient, scalable, and capable of delivering high-quality AR and mixed-reality experiences with limited computational resources. Other aspects and advantages of various embodiments of the present invention are set forth below in the description of the several figures.

FIG. 1 is a diagram illustrating an example of an individual 102 wearing an augmented reality (AR) device, in the specific form of AR glasses 104, consistent with an embodiment of the invention, while walking through a real-world environment 100 dotted with trees, while subtly turning their head from side to side to engage with their surroundings. The user 102 is depicted traversing a path 106, which meanders through the environment 100. As the user moves, the AR glasses 104, equipped with a combination of hardware and software for performing a SLAM process, continuously capture and process data to perform localization and mapping functions.

The AR glasses 104 are designed to collect visual data from the environment using built-in image sensors. These sensors capture images of the surrounding area, including trees 108 and other landmarks, which are essential for creating a map of the environment 100. Simultaneously, motion sensors within the AR glasses 104, such as accelerometers and gyroscopes, gather data on the user's head movements, providing information on the orientation and position of the user 102 as they navigate the path 106. The SLAM component of the AR glasses 104 synthesizes this visual and motion data to determine the user's precise location within the environment 100 and to update a map of the environment in real-time.

In a system with poor memory management, the SLAM algorithm would process and store a vast amount of keyframe data derived via raw data obtained from the sensors, leading to a significant computational load and increased memory usage. As the user 102 turns their head from side to side, observing the trees 108, the system would capture numerous frames, selecting from amongst the numerous frames several keyframes, many of which might contain overlapping or redundant information due to the similarity in viewpoints as the user slowly walks and looks at the trees from slightly different angles.

Consistent with some embodiments, an improved AR device addresses this problem by implementing pose quantization-based keyframe pruning within the SLAM component. As the user 102 walks and observes the environment 100, the SLAM algorithm quantizes the pose data, effectively grouping keyframes into quantized cells or bins based on their spatial and orientation data. When the system detects multiple keyframes within the same cell—that is, keyframes representing similar viewpoints—it evaluates them to identify and retain only the most informative keyframe(s). This process introduces a sophisticated two-tiered data filtering mechanism. Initially, keyframes are selected from a broader set of frames, effectively distilling the most relevant frames based on specific criteria. Subsequently, the keyframe pruning algorithm refines this selection by pruning redundant keyframes, retaining only those that contain the most valuable and pertinent data. This dual-layered approach significantly reduces the number of keyframes that need to be stored, thereby decreasing both the memory requirements and the computational load on the AR glasses 104. Consequently, consistent with some examples, the pruning algorithm enhances the efficiency of the AR device, facilitating a seamless and interactive augmented reality experience for the user 102, while optimizing the use of system resources. In the context of the pose quantization-based keyframe pruning process, the cells in table 200 that display a value of one indicate that exactly one keyframe has been retained for that specific instance of pose data. This signifies that within the corresponding quantized cell or bin, the SLAM algorithm has determined that a single keyframe suffices to represent the spatial and orientation information for that segment of the environment.

Consistent with some embodiments, the number of keyframes maintained for any individual cell or bin of the pose grid may vary based on the complexity and informational content of the environment at that location. There are scenarios where it may be beneficial to have multiple keyframes for a specific position or orientation within an environment. For example, if the environment contains dynamic elements, such as moving objects or changing lighting conditions, having multiple keyframes can capture these variations over time, providing a richer dataset for the SLAM algorithm to accurately map and understand the environment. Additionally, in areas where the environment is feature-rich, multiple keyframes can ensure that all relevant features are captured from slightly different perspectives, enhancing the robustness of the map and improving the device's ability to relocalize within the environment during subsequent visits.

Furthermore, maintaining multiple keyframes for a given cell can be advantageous for error correction and redundancy. If one keyframe is corrupted or of poor quality, the presence of additional keyframes ensures that the SLAM algorithm still has access to reliable data to maintain the integrity of the environmental map. This redundancy is particularly important in applications where precision and reliability are paramount, such as in navigation aids for visually impaired users or in industrial AR applications where accurate spatial information is critical for task completion. The system's ability to dynamically adjust the number of keyframes per cell allows for a tailored approach to data retention, balancing memory usage with the need for detailed environmental representation.

Figure 2:
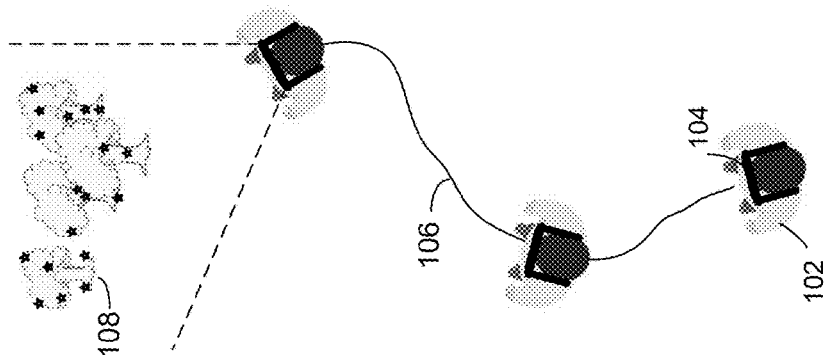
FIG. 2 is a diagram illustrating a two-dimensional table, where each cell in the table indicates a number of data points relating to spatial data, each data point associated with a keyframe that has been obtained by an AR device executing an algorithm for Simultaneous Localization and Mapping (SLAM), consistent with some examples.
Figure 2:
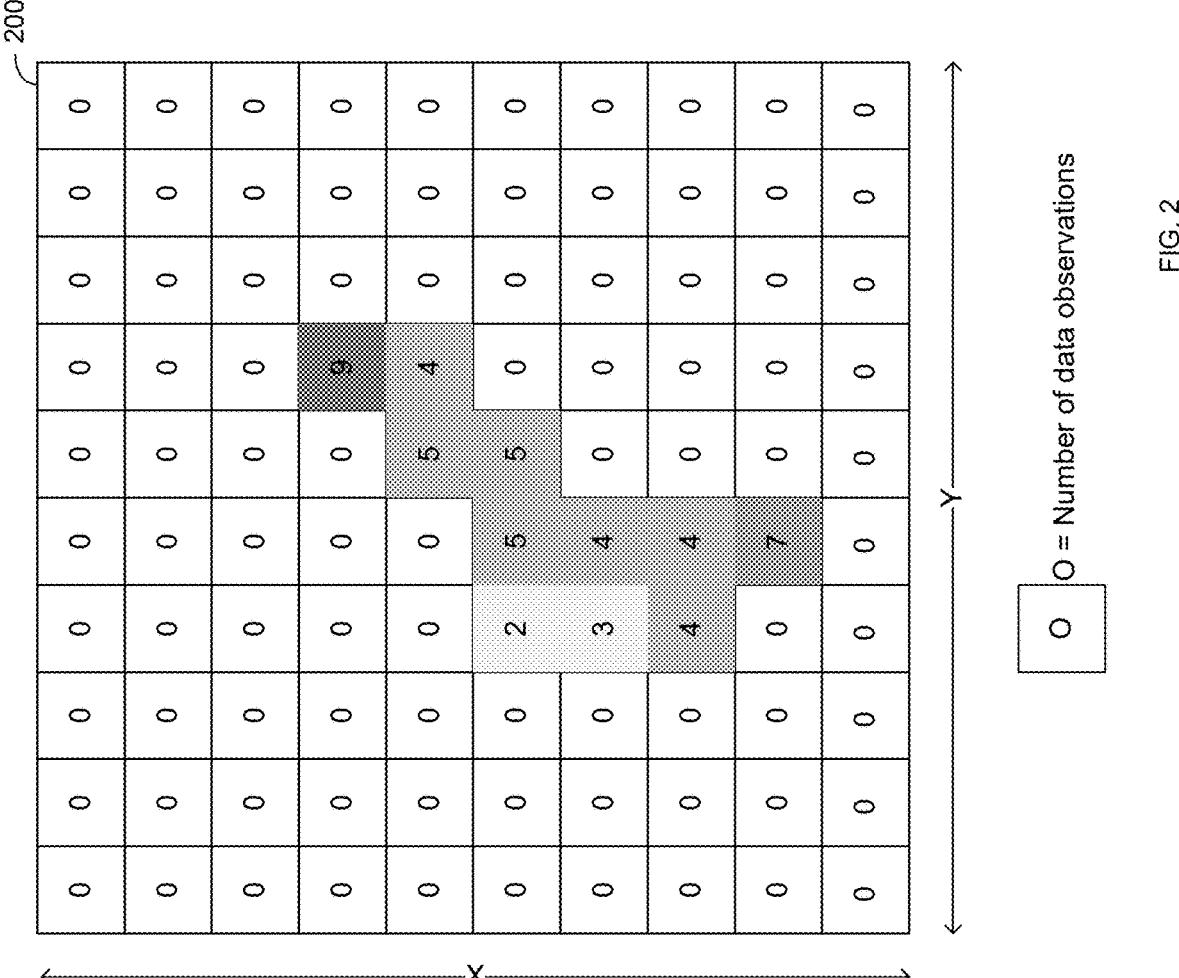

FIG. 2 is a diagram illustrating a two-dimensional table 200, where each cell in the table 200 indicates a number of keyframes obtained by an AR device 104 executing an algorithm for SLAM, having spatial data satisfying position coordinates (e.g. X and Y) corresponding to the cell, consistent with some embodiments of the invention. The table 200 depicted in FIG. 2 serves as a visual representation of a concept central to the operation of the SLAM algorithm within the AR device 104. The table 200 is organized into rows and columns that correspond to the X and Y dimensions of the physical space in which the AR device 104 is operating. Each cell within the table represents a discrete location (e.g., X and Y coordinance) in space, and the value contained in each cell reflects the number of keyframes that have been obtained and stored for that specific location, by the SLAM algorithm.

As the user 102 traverses the path 106, the AR device captures spatial data at various points along the journey. Cells within the table 200 that have values greater than zero indicate locations where one or more keyframes have been generated. These higher values typically align with the user's path, suggesting that the user 102 has spent more time in these areas or has observed these areas from multiple angles, resulting in a greater number of keyframes being collected by the AR device 104.

In reality, the pose grid operates in a multi-dimensional space, extending beyond the two-dimensional representation shown in FIG. 2. Pose data that can be quantized and grouped includes not only the X and Y spatial coordinates but also the Z coordinate for height or depth, as well as orientation angles of the AR device such as yaw, pitch, and roll. These additional dimensions allow the SLAM algorithm to "understand" and map the environment 100 in three-dimensional space, taking into account the full pose of the AR device 104 at each location.

By quantizing this multi-dimensional pose data, the SLAM algorithm can create a more complex grid where each cell, or bin, corresponds to a unique combination of spatial and orientation data. This enables the AR device, executing the algorithm, to identify and group together keyframes that share similar pose characteristics. Accordingly, the quantization process facilitates the efficient pruning of redundant keyframes, as the algorithm can compare keyframes within the same cell or bin and retain only those that add unique and valuable information to the map. This multi-dimensional pose grid allows for a more sophisticated and resource-efficient approach to data management in AR devices with SLAM systems and algorithms.

Figure 3:
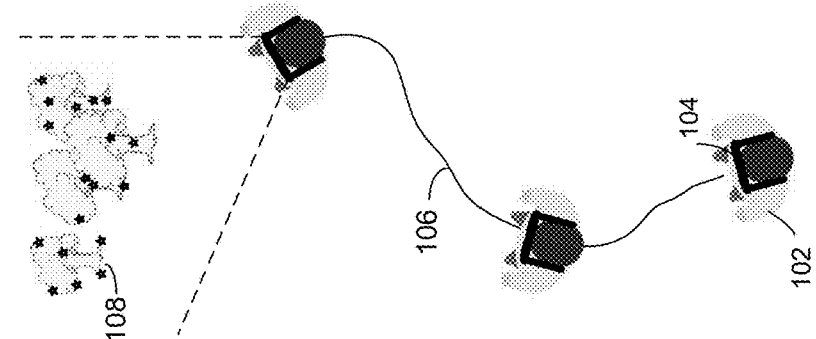
FIG. 3 is a diagram illustrating a bar chart, where each bar in the chart indicates a number of keyframes obtained by an AR device executing a SLAM algorithm, grouped by their orientation data (e.g., yaw), consistent with some examples.
Figure 3:
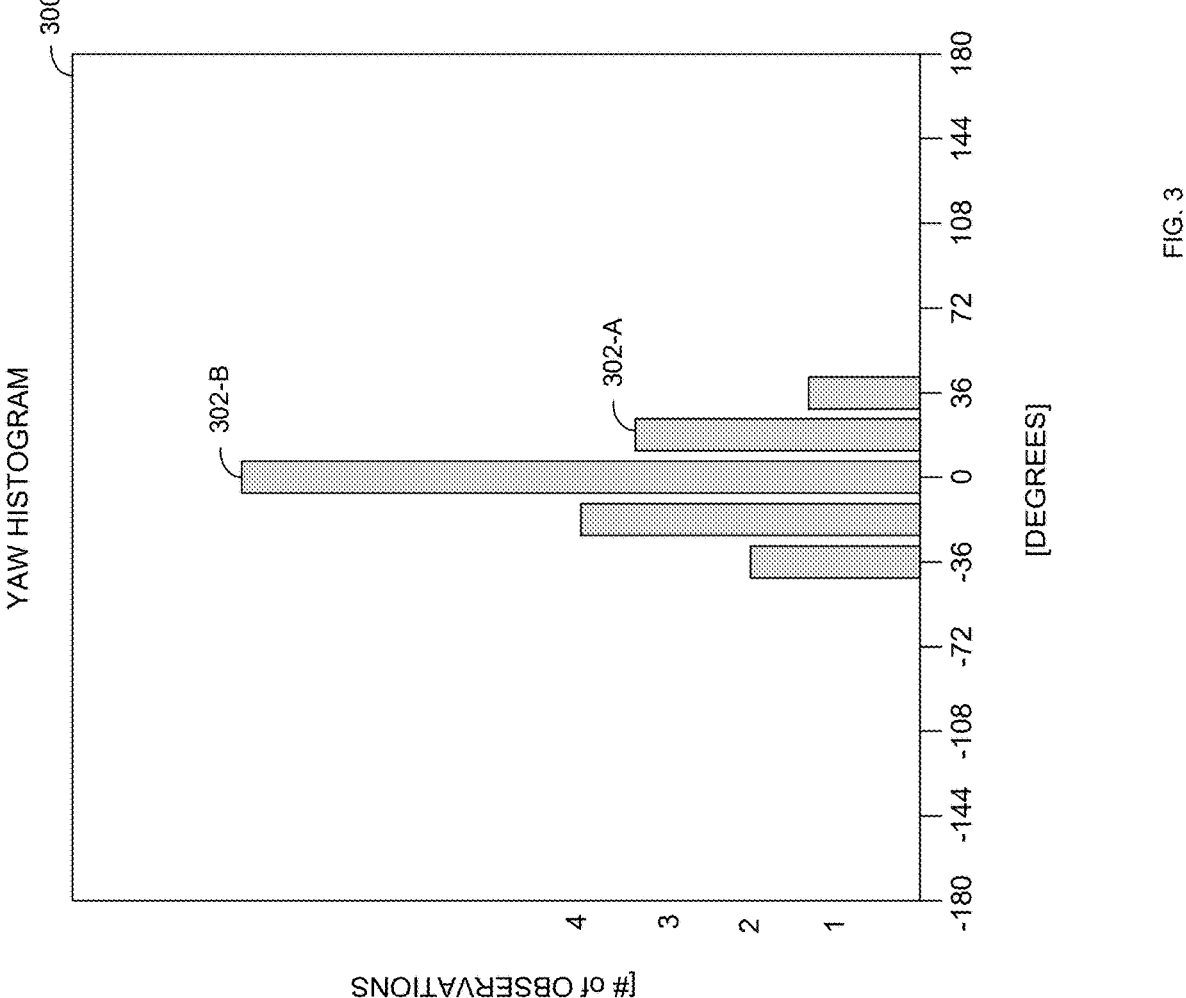

FIG. 3 is a diagram illustrating a bar chart 300, where the height of each bar (e.g., 302-A and 302-B) represents the number of keyframes that have been obtained and stored by an AR device executing a SLAM algorithm. Each bar 302-A and 302-B corresponds with keyframes having spatial data that includes a yaw angle falling within the specified bin size. Each bar 302-A and 302-B in the bar chart 300 represents a quantized range of viewing angles, with the height of the bar corresponding to the number of keyframes, that have yaw angles that fall within that specific range. These keyframes are captured by the AR device 104 as it orients itself in various directions within the environment. The bar chart 300 effectively conveys the distribution of keyframes across different orientation angles, such as yaw, which is the rotation around the vertical axis.

Similar to the concept illustrated in FIG. 2, the bar chart in FIG. 3 embodies the idea of a pose grid, albeit focusing on the orientation aspect of pose data rather than spatial coordinates. Accordingly, the table 200 (FIG. 2) and the bar chart 300 can be thought of as depicting or conveying a portion of the pose grid. In practice, the SLAM system is multidimensional, considering both the spatial and orientation data to create a comprehensive map of the environment.

Consistent with embodiments, the granularity of the keyframe data captured is directly influenced by the cell size determined by the quantization technique. For instance, if each bar in the bar chart represents a 12-degree range of yaw angles, this implies that the cell or bin size for orientation data is relatively large. Consequently, each cell may contain a greater number of keyframes, but with less granularity in terms of the distinctiveness of viewing angles. Conversely, if the cell size is defined to be smaller, such as a 1-degree range, there will be a larger number of cells with fewer keyframes in each. This increased granularity means that the keyframes within each cell are more likely to be closely aligned in terms of their viewing angles, offering a more precise representation of the device's orientation at different points in time.

The choice of cell size in the quantization process is a trade-off between the amount of data retained and the level of detail in the spatial and orientation data. A larger cell size may lead to more efficient data storage and processing, as fewer, more general keyframes are retained. In contrast, a smaller cell size can result in a more detailed and accurate map, as the keyframes are more finely differentiated by their position and viewing angles, but at the cost of increased memory usage and computational demand.

Based on the aforementioned considerations, various implementations of AR devices with differing memory configurations may benefit from different quantization parameters that impact the pose grid size and the associated data management strategies. Devices with limited memory resources may opt for a larger cell size in the quantization process, thereby reducing the number of keyframes stored and conserving memory, albeit at the expense of the precision of spatial and/or orientation data. This approach can still provide a functional and effective SLAM operation by prioritizing the most distinctive keyframes within broader orientation ranges, ensuring that the essential features of the environment are captured without overburdening the system's memory.

On the other hand, AR devices equipped with more abundant memory resources might leverage the advantages of a smaller cell size for a more detailed pose grid. This allows for a finer resolution of spatial and/or orientation data, which can be particularly beneficial in applications where precision is paramount, such as in intricate navigation tasks or when overlaying digital content with high accuracy in augmented reality experiences. The ability to tailor the quantization parameters to the specific memory capabilities and performance requirements of the AR device underscores the versatility of the techniques described herein, enabling a wide range of applications and user experiences across different hardware platforms.

Figure 4:
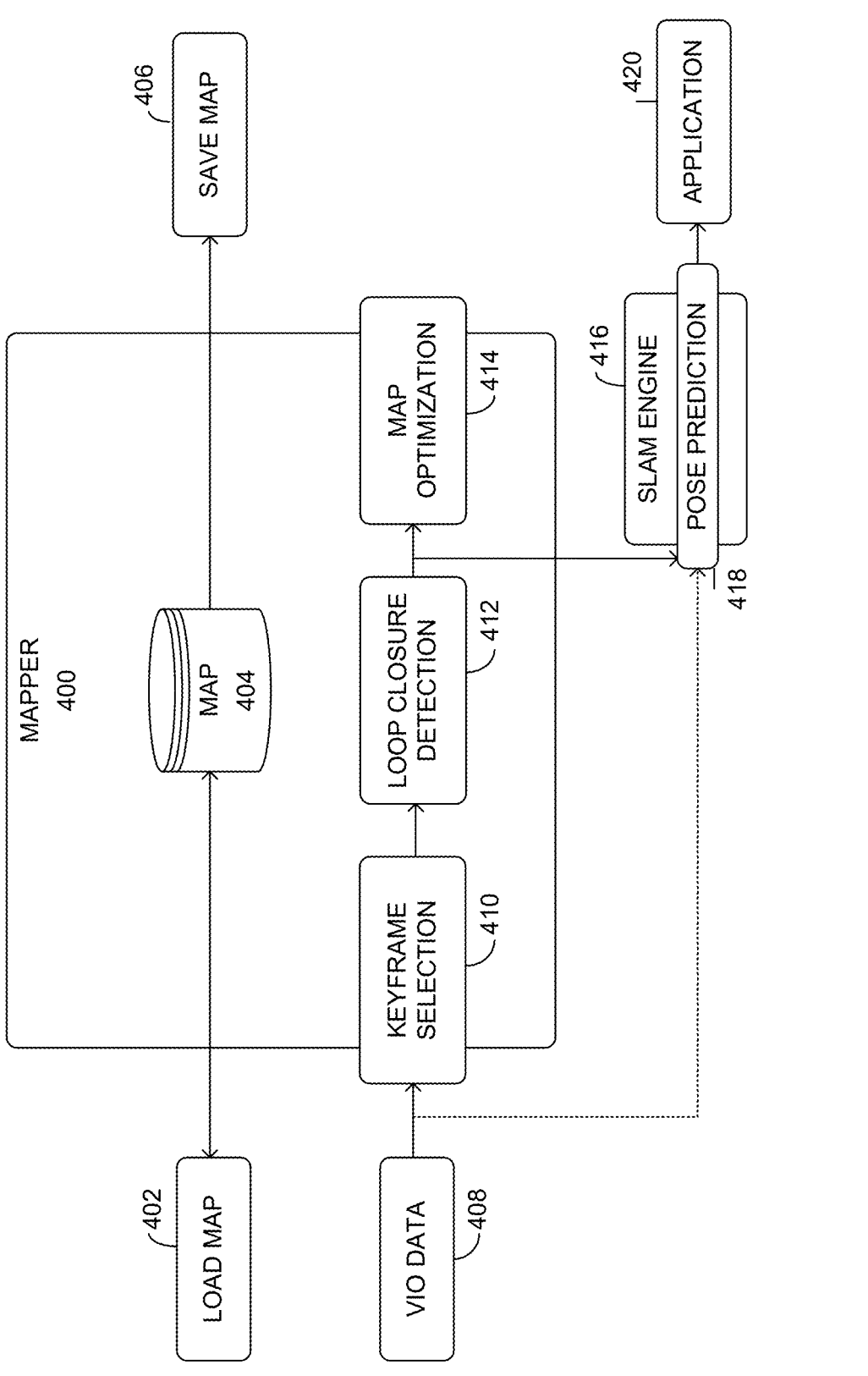
FIG. 4 is a diagram illustrating a mapping pipeline for a SLAM algorithm or system, consistent with examples.

FIG. 4 is a diagram illustrating a mapping pipeline for a SLAM algorithm, consistent with embodiments of the invention. The mapper 400 and corresponding data processing pipeline, as illustrated in FIG. 4, is a component of the AR device that provides the ability to understand and interact with the real-world environment. The mapper 400 operates in conjunction with the SLAM engine 416, which is responsible for generating pose prediction data 418 in real-time. This data 418 is essential for any application, such as application 420, to accurately comprehend the position and viewing angle of the AR device, thereby enabling it to track real-world objects and overlay virtual objects seamlessly within the user's field of view.

The Visual Inertial Odometry (VIO) data 408 is a stream of information obtained from the AR device's camera systems and motion sensors. This data includes images captured by a camera, as well as motion data such as acceleration and rotational velocities from the inertial sensors. The keyframe selection 410 process involves filtering this VIO data to identify and retain only the most informative frames for use in the constructing and updating of the environmental map 404.

The loop closure detection component 412 operates in the mapper pipeline by identifying when the AR device has returned to a previously mapped location. This detection allows the system to correct any drift that may have occurred in the map over time, ensuring that the virtual and real-world align accurately. The mapper 400 has the capability to load 402 map data from an existing map of the environment. This pre-existing map data can be used as a reference to enhance the accuracy of real-time mapping and to facilitate quicker localization of the AR device within a known environment. Conversely, as the AR device explores new areas or updates its understanding of the environment, the newly obtained mapping data is saved 406, thereby enriching the map's detail and accuracy for future use.

Consistent with some embodiments, the mapper 400 dynamically determines the optimal timing for the quantization of pose data based on the current availability of system processing resources. Quantization, which is the process of converting continuous pose information-including spatial coordinates (X, Y, Z) and orientation angles (yaw, pitch, roll)—into discrete units, can be executed in real-time when the system's processing resources are sufficient. However, in certain scenarios where real-time processing may be hindered by limited hardware capabilities, the system may be designed to defer the quantization process. In such cases, the pose data of each keyframe is temporarily stored in its raw format and is processed and quantized at a later stage when the system is less burdened, thereby maintaining responsiveness without compromising the quality of the mapping data.

However, consistent with some embodiments, the quantization of pose data is consistently performed in real-time, ensuring that the environmental map is updated instantaneously as new keyframes are generated and stored. Conversely, with some alternative embodiments of the invention, the system may be configured to always perform quantization after the initial use and storage of the keyframe data. Each of these embodiments is tailored to optimize the performance of the SLAM process within the specific constraints and capabilities of the AR device's hardware.

The pruning algorithm within the mapper 400 is designed to optimize the storage and processing of keyframe data by selectively removing redundant or less informative keyframes. The timing of the pruning process can vary depending on the embodiment of the invention. In some embodiments, pruning is performed in real-time as part of the keyframe selection 410 process. This real-time pruning ensures that the environmental map 404 is maintained with only the most relevant and useful data, thereby conserving memory and processing power. In other embodiments, the pruning algorithm is applied in bulk and on demand, typically before saving the map data 406, but sometimes after saving the map data. This approach allows for a comprehensive review of the accumulated keyframes, including a selection process that considers both new and old keyframes, and a more extensive pruning operation, which can be particularly useful when preparing the map data for long-term storage or sharing.

The pruning algorithm identifies which cells or bins of the pose grid are subjected to the pruning process based on specific criteria. For instance, a cell or bin may only be considered for pruning if it contains or is associated with a number of keyframes that exceed a predetermined threshold. This threshold-based approach ensures that pruning is only applied to areas of the pose grid where there is a surplus of keyframe data, thereby maintaining the integrity of the map in regions with sparser keyframe coverage. Alternatively, the pruning algorithm may utilize a dynamic metric that reflects the overall memory capacity available to the mapper. This metric allows the system to adapt the pruning process to the current memory constraints, determining how many keyframes to remove and when to initiate the pruning based on the total available memory capacity.

The decision on which keyframes to retain and which to remove during the pruning process is made using a set of criteria that assess the quality and importance of each keyframe. High-quality keyframes that provide unique and clear information about the environment are prioritized for retention. In contrast, keyframes that offer redundant information or have lower quality, such as those with poor image clarity or stability, are candidates for removal. The pruning algorithm may also consider the distribution of keyframes across the pose grid, ensuring that the remaining keyframes offer comprehensive coverage of the environment from multiple perspectives. By intelligently managing the keyframe data in this manner, the mapper 400 maintains an efficient and accurate environmental map, tailored to the operational needs and resource limitations of the AR device.

Consistent with some embodiments, the pruning algorithm employs various data analysis techniques to discern the quality or value of each keyframe, thereby determining which data should be retained and which should be removed. The selection process is based on a set of criteria that assesses the contribution of each keyframe to the accuracy and richness of the environmental map. Keyframe quality can be evaluated in terms of the clarity and distinctiveness of the visual data it contains, the amount of unique environmental features it captures, and its relevance to the device's current understanding of the environment.

One such technique for assessing keyframe quality is image analysis, where keyframes with high-resolution images that contain a large number of identifiable features or landmarks are considered of higher quality. These keyframes are best for accurate feature matching and pose estimation, and thus are more likely to be kept. Another technique involves analyzing the geometric distribution of keyframes within the pose grid. Keyframes that fill gaps in the map or provide new perspectives on previously mapped areas are deemed valuable. For example, a keyframe that captures a previously occluded area of the environment would be considered high-value and retained over a keyframe that duplicates an already well-documented section.

Additionally, the pruning algorithm may consider the temporal relevance of keyframes. More recent keyframes might be favored over older ones if they provide updated information that reflects changes in the environment, such as the movement of objects or alterations to the scene. In contrast, keyframes that do not significantly enhance the map's detail or fail to provide new information may be deemed redundant and selected for removal.

The pruning algorithm can also incorporate machine learning techniques to predict the importance of keyframes. By training on historical data, the system can learn patterns that indicate the usefulness of certain keyframes in improving localization and mapping performance. For instance, keyframes taken at intersections or decision points within an environment may be identified as particularly beneficial for navigation and thus prioritized for retention.

Figure 5:
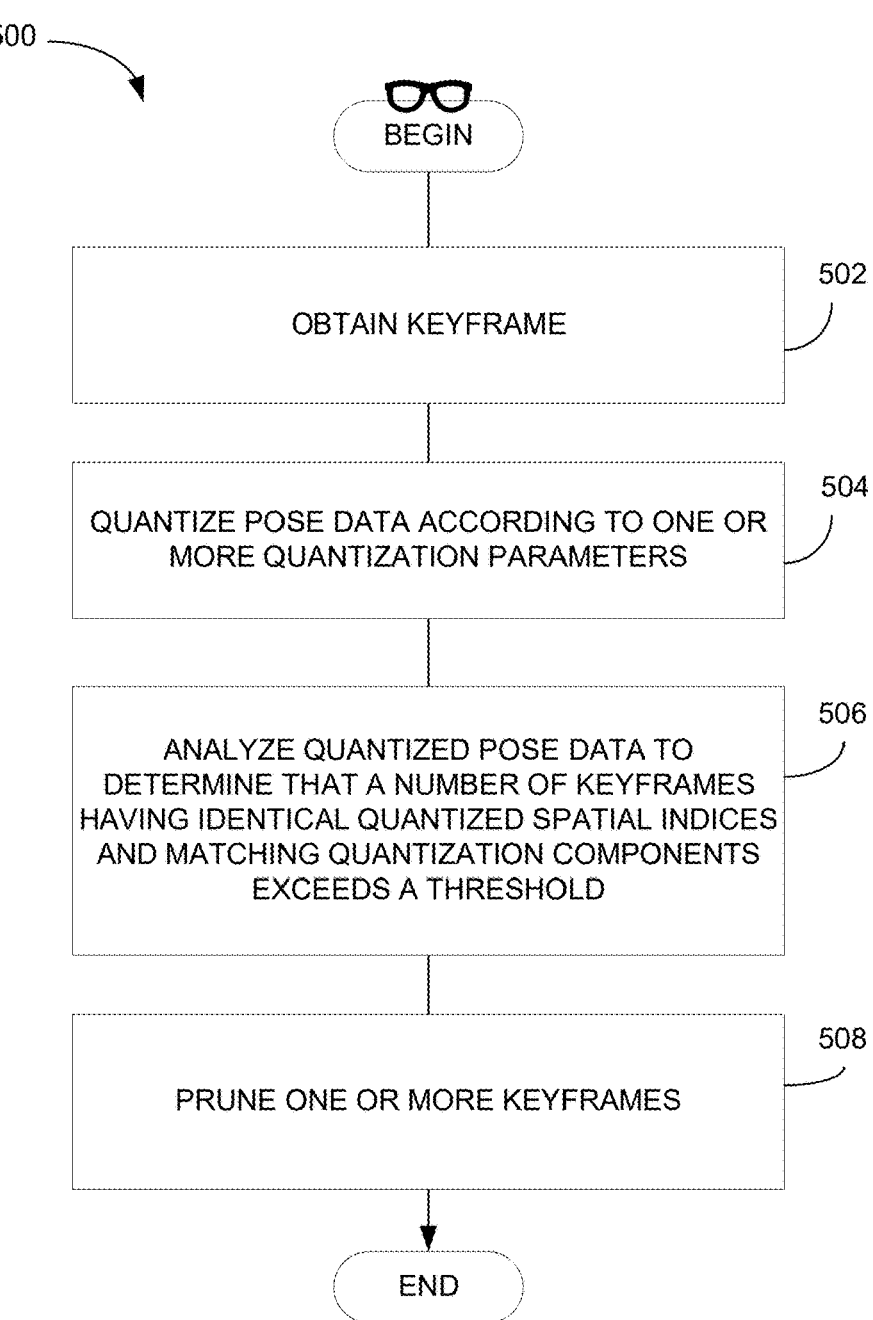
FIG. 5 is a diagram illustrating a flow chart corresponding to a method for pruning keyframe data, according to some examples.

FIG. 5 is a diagram illustrating a flow chart corresponding to a method 500 for managing and pruning keyframe data, according to some embodiments. At method operation 502, the AR device obtains a keyframe. The keyframe includes at least an image captured by the device's camera system and is linked to an instance of pose data. The pose data comprises spatial data in three dimensions (X, Y, and Z) derived from raw data obtained from one or more first sensors, such as GPS sensors, accelerometers, and depth cameras. Additionally, the pose data includes orientation data in three dimensions, where the pose data are derived from raw data obtained from one or more second sensors, including gyroscopes and magnetometers.

At method operation 504, the AR device begins the quantization of pose data by defining a three-dimensional grid that will serve as the basis for discretizing the continuous spatial data. The grid is established based on predefined quantization parameters, for example, by setting the origin point, typically the initial position of the device or a predetermined reference point in the environment, and determining the size of each grid cell or bin along the X, Y, and Z axes. The chosen bin size directly influences the granularity of the quantization; smaller bins yield a higher resolution map with finer detail, while larger bins result in a more compressed representation, beneficial for memory conservation but potentially less detailed.

The quantization parameters for the spatial data are then applied to each dimension. For instance, if the bin size is set to 0.5 meters, the continuous spatial data is divided into half-meter increments from the origin point. The AR device processes the keyframe's spatial data by calculating its relative position to the origin and then dividing these values by the bin size. The resulting quotient is rounded to the nearest integer, which corresponds to the bin index within the grid where the keyframe's pose data will be categorized.

In parallel with the spatial data, the orientation data of the keyframe is also quantized. The orientation, which may be represented by Euler angles or quaternions, undergoes a similar discretization process. For Euler angles, the full range of each angle is divided into segments based on the specified bin size in degrees. Each angle is then mapped to the closest bin, effectively categorizing the orientation data into discrete segments. If quaternions are used, the components are normalized and then rounded to the nearest value that aligns with the chosen precision level, placing the orientation within a specific bin in the orientation grid.

This quantization process results in a pose grid where each cell represents a unique combination of spatial indices and orientation components or indices. The AR device assigns each keyframe to a cell based on its quantized pose data, facilitating efficient comparison and identification of similar keyframes. By converting the continuous pose data into a structured, discrete format, the AR device can manage its computational resources more effectively, ensuring that the SLAM system operates optimally within the constraints of the device's memory and processing capabilities.

At method operation 506, the concept of a pose grid is utilized to analyze the quantized pose data. In this conceptual framework, keyframes with the same quantized spatial indices and matching quantized orientation components are considered to reside within the same virtual cell or bin. It is important to note that these cells or bins are not physical entities but rather logical groupings used to organize and categorize the keyframes in memory. This organization allows for efficient access and comparison of keyframes that share similar pose characteristics. The analysis conducted during this step assesses whether the accumulation of keyframes within any such virtual cell exceeds a predetermined threshold, indicating redundancy. This step allows for identifying which keyframes are superfluous and can be pruned to optimize the SLAM system's performance.

The final step, method operation 508, involves the pruning of one or more keyframes. When the analysis in step 504 reveals that the number of similar keyframes exceeds the predetermined threshold, the method involves deleting some keyframes from memory. This pruning reduces the memory usage and computational load of the SLAM system by eliminating redundant data. The pruning step is performed in a manner that retains the most informative keyframes, ensuring the integrity and accuracy of the environmental map maintained by the AR device.

The pruning process is performed with a focus on maintaining the quality of the environmental map. Consistent with some embodiments, to determine which keyframes to remove, the system evaluates several characteristics of each keyframe within the overpopulated virtual cell or bin. These characteristics may include, but are not limited to, the clarity of the image captured in the keyframe, the richness (e.g. quality, type, variation) of environmental features within the image, and the temporal proximity of the keyframe's timestamp relative to others in the same cell. For example, keyframes with blurry or low-resolution images, or those that offer no additional environmental detail compared to their counterparts, are marked as candidates for removal. Similarly, if multiple keyframes were captured in quick succession, resulting in nearly identical images, some may be deemed redundant and selected for pruning.

In practice, the system may employ a ranking algorithm to score each keyframe based on the aforementioned characteristics. A keyframe with a clear, high-resolution image that captures a unique perspective of the environment would score highly and be prioritized for retention. Conversely, a keyframe with a lower score, indicating lesser value to the map's integrity, would be flagged for deletion. For instance, if a virtual cell contains five keyframes, and three of them depict the same feature from similar angles and lighting conditions, the system might retain the keyframe with the highest clarity and discard the other two.

The pruning algorithm ensures that at least one keyframe from each significant viewpoint is retained, preserving the environmental map's accuracy and navigability. This selective retention is important for applications where the AR device may need to relocalize within a previously mapped area. By intelligently managing keyframe data, the SLAM system maintains an efficient and accurate map, enabling robust AR experiences without exceeding the device's memory and computational constraints.

While the method depicted in FIG. 5 illustrates the quantizing and pruning operations as sequential steps, in actual implementation, these operations may be ongoing and occur in the background, independent of each other's completion. The timing of these operations is configurable and can be tailored to the specific needs of the SLAM system and the capabilities of the AR device.

The quantizing operation can be set to occur in real-time as new keyframes are obtained, ensuring that the pose data is immediately structured into the conceptual pose grid. This allows for rapid comparison and categorization of incoming data. Alternatively, the quantizing operation may be scheduled to run at predetermined intervals or triggered by specific events, such as the acquisition of a certain number of new keyframes or when the device enters a new environment, or when memory utilization exceeds some predefined metric.

Similarly, the pruning operation can be configured to run concurrently with the quantizing operation. It may operate continuously, evaluating and removing redundant keyframes as they are identified. This ensures that the memory usage is kept in check and that the environmental map is always optimized for the most recent observations. In some embodiments, pruning may be triggered on-demand, such as before saving the map data to long-term storage or when the system detects that memory usage has reached a certain threshold.

The flexibility in timing allows the SLAM system to maintain efficiency without being bound to a rigid processing order. For example, the system could be quantizing new keyframes while simultaneously pruning older data from a different section of the map. This overlapping of operations is possible due to the independent nature of each process and the logical structure provided by the pose grid, which organizes keyframes in a way that is conducive to parallel processing. With some embodiments, the SLAM system may be designed to adapt the timing of quantizing and pruning operations to the operational context, balancing the need for immediate data processing with the constraints of computational resources. This adaptive approach ensures that the AR device can maintain a high level of performance and provide a seamless user experience, regardless of the complexity or size of the environment being mapped.

Example Augmented Reality (Ar) Device

Figure 6:
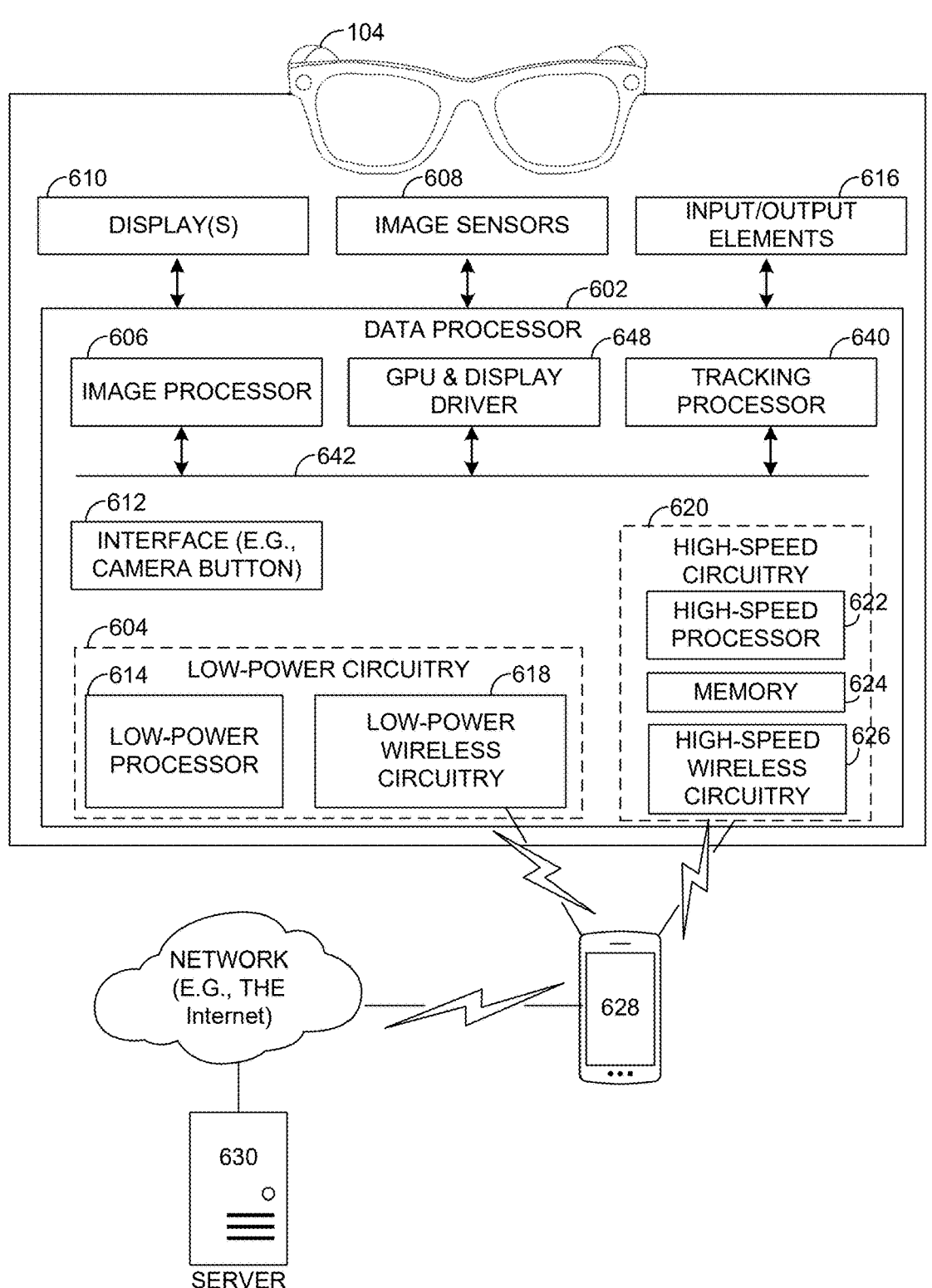
FIG. 6 is a block diagram illustrating an example of the functional components (e.g., hardware components) of an AR device (e.g., AR glasses) with which the methods and techniques described herein, may be implemented, consistent with examples.

FIG. 6 is a block diagram illustrating an example of the functional components (e.g., hardware components) of an AR device (e.g., AR glasses 104) with which the methods and techniques described herein, may be implemented, consistent with embodiments of the present invention. Those skilled in the art will readily appreciate that the AR glasses 200 depicted in FIG. 6 are but one example of the many different devices to which the inventive subject matter may be applicable. For example, embodiments of the present invention are not limited to AR glasses, but are also applicable to AR headsets, and other wearable virtual reality devices and mixed reality devices.

The AR glasses 104 include a data processor 602, a display 610, two or more image sensors 608, and additional input/output elements 616. The input/output elements 616 may include microphones, audio speakers, biometric sensors, additional sensors, or additional display elements integrated with the data processor 602. For example, the input/output elements 616 may include any of I/O components, including motion components, and so forth.

Consistent with one example, and as described herein, the display 610 includes a first sub-display for the user's left eye and a second sub-display for the user's right eye. Accordingly, although referenced in the singular (a display), the display may, in some examples, comprises two separate displays that operate together. Each display of the AR glasses 104 may include a forward optical assembly (not shown) comprising a right projector and a right near eye display, and a forward optical assembly including a left projector and a left near eye display. In some examples, the near eye displays are waveguides. The waveguides include reflective or diffractive structures (e.g., gratings and/or optical elements such as mirrors, lenses, or prisms). Light emitted by the right projector encounters the diffractive structures of the waveguide of the right near eye display, which directs the light towards the right eye of a user to provide an image on or in the right optical element that overlays the view of the real world seen by the user. Similarly, light emitted by a left projector encounters the diffractive structures of the waveguide of the left near eye display, which directs the light towards the left eye of a user to provide an image on or in the left optical element that overlays the view of the real world seen by the user.

The data processor 602 includes an image processor 606 (e.g., a video processor), a graphics processor unit (GPU) & display driver 648, a tracking processor 640, an interface 612, low-power circuitry 604, and high-speed circuitry 620. The components of the data processor 602 are interconnected by a bus 642.

The interface 612 refers to any source of a user command that is provided to the data processor 602 as input. In one or more examples, the interface 612 is a physical button that, when depressed, sends a user input signal from the interface 612 to a low-power processor 614. A depression of such button followed by an immediate release may be processed by the low-power processor 614 as a request to capture a single image, or vice versa. A depression of such a button for a first period of time may be processed by the low-power processor 614 as a request to capture video data while the button is depressed, and to cease video capture when the button is released, with the video captured while the button was depressed stored as a single video file. Alternatively, depression of a button for an extended period of time may capture a still image. In some examples, the interface 612 may be any mechanical switch or physical interface capable of accepting and detecting user inputs associated with a request for data from the image sensor(s) 608. In other examples, the interface 612 may have a software component, or may be associated with a command received wirelessly from another source, such as from the client device 628.

The image processor 606 includes circuitry to receive signals from the image sensors 608 and process those signals from the image sensors 608 into a format suitable for storage in the memory 624 or for transmission to the client device 628. In one or more examples, the image processor 606 (e.g., video processor) comprises a microprocessor integrated circuit (IC) customized for processing sensor data from the image sensors 608, along with volatile memory used by the microprocessor in operation.

The low-power circuitry 604 includes the low-power processor 614 and the low-power wireless circuitry 618. These elements of the low-power circuitry 604 may be implemented as separate elements or may be implemented on a single IC as part of a system on a single chip. The low-power processor 614 includes logic for managing the other elements of the AR glasses 104. As described above, for example, the low-power processor 614 may accept user input signals from the interface 612. The low-power processor 614 may also be configured to receive input signals or instruction communications from the client device 628 via the low-power wireless connection. The low-power wireless circuitry 618 includes circuit elements for implementing a low-power wireless communication system. Bluetooth™ Smart, also known as Bluetooth™ low energy, is one standard implementation of a low power wireless communication system that may be used to implement the low-power wireless circuitry 618. In other examples, other low power communication systems may be used.

The high-speed circuitry 620 includes a high-speed processor 622, a memory 624, and a high-speed wireless circuitry 626. The high-speed processor 622 may be any processor capable of managing high-speed communications and operation of any general computing system used for the data processor 602. The high-speed processor 622 includes processing resources used for managing high-speed data transfers on the high-speed wireless connection 634 using the high-speed wireless circuitry 626. In some examples, the high-speed processor 622 executes an operating system such as a LINUX operating system or other such operating system. In addition to any other responsibilities, the high-speed processor 622 executing a software architecture for the data processor 602 is used to manage data transfers with the high-speed wireless circuitry 626. In some examples, the high-speed wireless circuitry 626 is configured to implement Institute of Electrical and Electronic Engineers (IEEE) 802.11 communication standards, also referred to herein as Wi-Fi. In other examples, other high-speed communications standards may be implemented by the high-speed wireless circuitry 626.

The memory 624 includes any storage device capable of storing camera data generated by the image sensors 608 and the image processor 606. While the memory 624 is shown as integrated with the high-speed circuitry 620, in other examples, the memory 624 may be an independent standalone element of the data processor 402. In some such examples, electrical routing lines may provide a connection through a chip that includes the high-speed processor 622 from image processor 606 or the low-power processor 614 to the memory 624. In other examples, the high-speed processor 622 may manage addressing of the memory 624 such that the low-power processor 614 will boot the high-speed processor 622 any time that a read or write operation involving the memory 624 is desired.

The tracking processor 640 estimates a pose of the AR glasses 104. For example, the tracking processor 640 uses image data and corresponding inertial data from the image sensors 608 and the position components, as well as GPS data, to track a location and determine a pose of the AR glasses 104 relative to a frame of reference (e.g., real-world scene). The tracking module 640 continually gathers and uses updated sensor data describing movements of the AR glasses 104 to determine updated three-dimensional poses of the AR glasses 104 that indicate changes in the relative position and orientation relative to physical objects in the real-world environment. The tracking processor 640 permits visual placement of virtual objects relative to physical objects by the AR glasses 104 within the field of view of the user via the displays 610.

The GPU & display driver 638 may use the pose of the AR glasses 104 to generate frames of virtual content or other content to be presented on the displays 410 when the AR glasses 104 are functioning in a traditional AR mode. In this mode, the GPU & display driver 638 generate updated frames of virtual content based on updated three-dimensional poses of the AR glasses 104, which reflect changes in the position and orientation of the user in relation to physical objects in the user's real-world environment.

One or more functions or operations described herein may also be performed in an application resident on the AR glasses 104 or on the client device 628, or on a remote server 630. Consistent with some examples, the AR glasses 104 may operate in a networked system, which includes the AR glasses 104, the client computing device 628, and a server 630, which may be communicatively coupled via the network. The client device 628 may be a smartphone, tablet, phablet, laptop computer, access point, or any other such device capable of connecting with the AR glasses 104 using a low-power wireless connection and/or a high-speed wireless connection. The client device 628 is connected to the server system 630 via the network. The network may include any combination of wired and wireless connections. The server 630 may be one or more computing devices as part of a service or network computing system.

As presented herein, numerous examples are provided where quantization is applied across each dimension-both spatial and angular—of the pose data collected by an augmented reality (AR) device. This comprehensive approach ensures that the SLAM algorithm can effectively manage and prune keyframe data, optimizing the environmental mapping process for a wide range of motion and orientations encountered in dynamic AR applications. By quantizing each dimension, the algorithm can create a detailed and accurate map of the environment, which is important for the seamless functioning of AR systems.

However, in various alternative embodiments, the quantization process could be selectively applied to fewer than all dimensions, tailored to the specific requirements and constraints of the AR device or the application scenario. For instance, in environments where the AR device experiences minimal spatial movement-such as in applications focused on stationary or spatially constrained activities—it may be more efficient to apply quantization predominantly or exclusively to angular dimensions, such as yaw and pitch. This selective quantization reduces computational overhead and memory usage by focusing on the most relevant dimensions of movement, which in these cases are the orientations rather than positions.

This tailored approach to quantization is particularly advantageous for devices that are either fixed in position or have limited movement. In such scenarios, quantizing based on angular data alone can significantly streamline the data processing requirements, as changes in position are minimal and less critical to the mapping accuracy. Conversely, for devices that navigate extensively through space, a more balanced quantization across both spatial and angular dimensions might be necessary to maintain a high-quality map. Thus, the flexibility to configure the quantization process according to the specific use case allows the SLAM algorithm to operate more efficiently, adapting to the unique demands of different AR applications and device capabilities.

Furthermore, in the realm of AR and mixed-reality devices, the integration of multiple cameras may significantly enhance the device's ability to capture and interpret the surrounding environment. These multi-camera setups not only improve the quality of visual data but also enrich the spatial data used by SLAM algorithms. For instance, some advanced AR devices may incorporate a dozen or more cameras, each providing a unique perspective of the environment. This multiplicity of viewpoints allows for a more comprehensive and detailed mapping, for creating an immersive AR experience.

The presence of multiple cameras impacts the SLAM algorithm, particularly the pose estimation and keyframe pruning processes. Each camera captures distinct visual data, which can be used to estimate the device's pose with greater accuracy. Some of the methods, described herein, leverage data from a variety of sensors, including these multiple camera systems. The spatial data derived from these cameras provides diverse visual inputs that help in accurately determining the device's orientation and position within a given environment.

When it comes to the pruning algorithm, the inclusion of multiple cameras introduces additional complexity as well as opportunity. In some examples, the pruning algorithm may handle a larger volume of keyframes due to the increased data inputs from the multiple cameras. However, this also provides a richer dataset for the pruning algorithm to analyze. The algorithm can assess keyframes from different cameras to determine redundancy not just within the data of a single camera but across the data collected from all cameras. This cross-camera analysis allows the pruning algorithm to make more informed decisions about which keyframes to retain and which to discard, ensuring that only the most informative and diverse keyframes are preserved. This may be particularly beneficial in environments where comprehensive spatial coverage and detailed environmental mapping are critical.

In an embodiment of the invention, a device equipped with multiple cameras can utilize this setup to enhance the SLAM process by allowing the system to selectively prune keyframes across different viewpoints. This capability ensures that the environmental map maintained by the device remains accurate and up-to-date without becoming overly burdensome in terms of memory and computational requirements. The ability to dynamically adjust the pruning process based on the input from multiple cameras also makes the SLAM system more adaptable and efficient, capable of handling complex mapping tasks in dynamic environments.

Software Architecture

Figure 7:
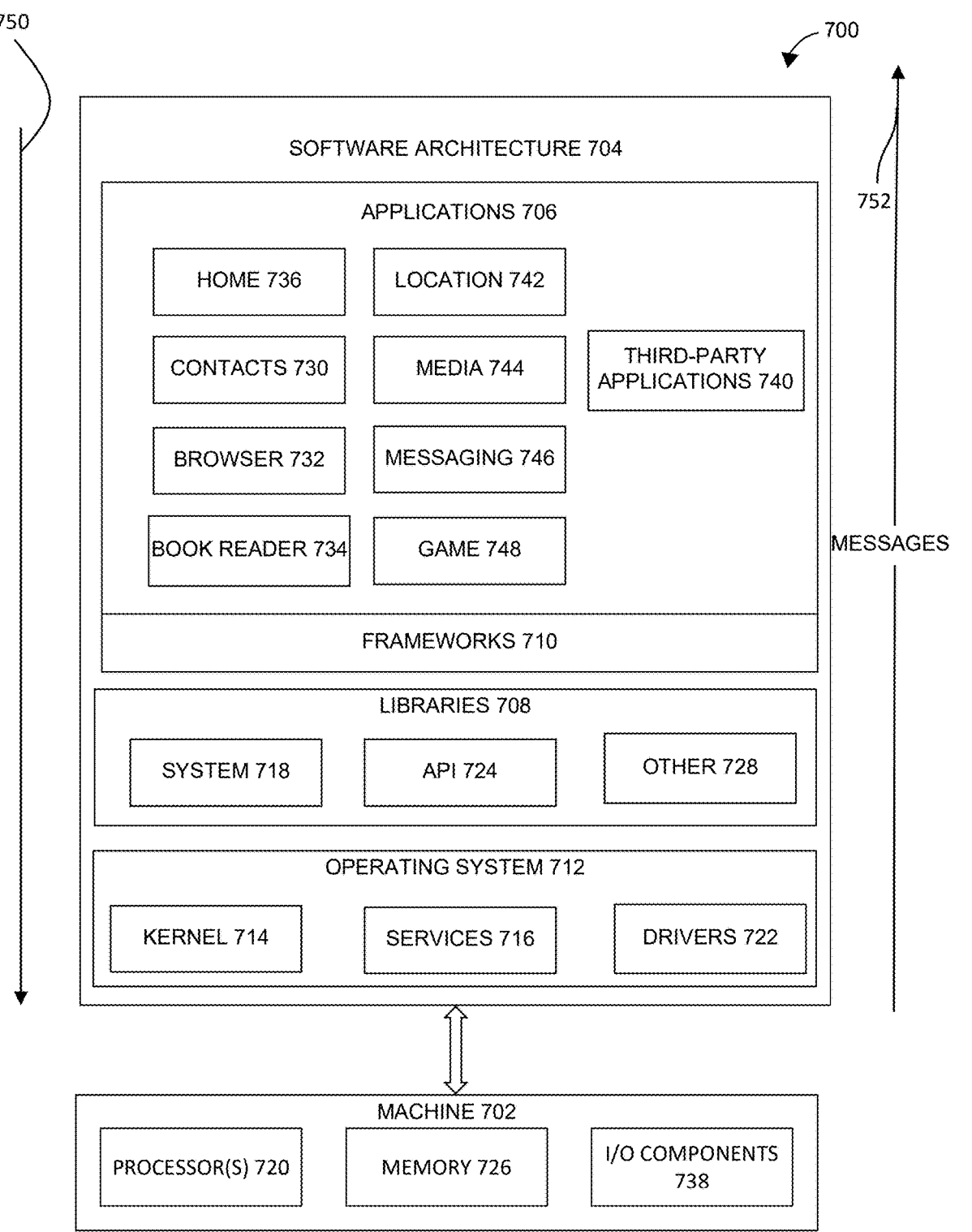
FIG. 7 is a block diagram illustrating a software architecture, which can be installed on any one or more of the devices described herein.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where individual layers provides a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other Applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., Applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

EXAMPLES

Example 1 is a method for managing keyframe data in a Simultaneous Localization and Mapping (SLAM) system of an Augmented Reality (AR) device, the method comprising: obtaining, by the AR device, a plurality of keyframes, each keyframe comprising at least an image linked to an instance of pose data, wherein the pose data comprises spatial data in three dimensions (X, Y, and Z) derived from one or more spatial sensing systems, and orientation data in three dimensions obtained from one or more orientation sensing systems; quantizing, for each keyframe, the pose data according to predefined quantization parameters to generate quantized pose data, wherein the quantized pose data includes, quantized spatial indices and quantized orientation components; analyzing the quantized pose data of the keyframes to determine that a number of keyframes having identical quantized spatial indices in all three dimensions and matching quantized orientation components exceeds a predetermined threshold; and pruning the number of keyframes by deleting from memory at least one keyframe from the number of keyframes when the predetermined threshold is exceeded.

In Example 2, the subject matter of Example 1 includes, wherein the quantization parameters include at least a first quantization parameter for the spatial data and at least a second quantization parameter for the orientation data, the first quantization parameter for the spatial data defining a spatial grid size segmenting space in the three dimensions into a plurality of discrete spatial cells of a specified size, and the second quantization parameter for the orientation data defining angular grid cell sizes that segment the orientation space into a plurality of discrete orientation cells.

In Example 3, the subject matter of Examples 1-2 includes, wherein the spatial sensing system comprises at least one sensor selected from the group consisting of accelerometers, gyroscopes, magnetometers, and Global Positioning System (GPS) receivers, and wherein the spatial data is derived from measurements obtained from any combination of one or more of the selected sensors.

In Example 4, the subject matter of Examples 1-3 includes, wherein the orientation sensing system comprises at least one sensor selected from the group consisting of gyroscopes, magnetometers, and inertial measurement units (IMUs), and wherein the orientation data is derived from measurements obtained from any combination of one or more of the selected sensors.

In Example 5, the subject matter of Examples 1-4 includes, wherein pruning the number of keyframes when the predetermined threshold is exceeded further comprises selecting at least one keyframe for removal based on criteria comprising image clarity, feature richness of the image linked to the pose data, and temporal proximity of a timestamp of the keyframe to other keyframes, wherein keyframes with lower image clarity, lesser feature richness, or closer timestamp proximity to other keyframes are prioritized for removal.

In Example 6, the subject matter of Examples 1-5 includes, dynamically adjusting the quantization parameters based on factors comprising the variability of spatial features, the rate of change in orientation data, and the diversity of lighting conditions, and wherein the adjustment of the quantization parameters is performed to balance the granularity of the quantized pose data with a computational load and memory usage of the AR device.

In Example 7, the subject matter of Examples 1-6 includes, wherein quantizing the pose data further comprises: incorporating lighting conditions as an additional dimension in the quantization process, wherein the lighting conditions are quantified based on a metric that characterizes the illumination of the environment, and wherein the quantized pose data includes a lighting condition index that distinguishes keyframes based on the quantified lighting conditions.

Example 8 is an augmented reality (AR) device configured to manage keyframe data in a Simultaneous Localization and Mapping (SLAM) system, the AR device comprising: a display; a processor; a spatial sensing system; an orientation sensing system; and a memory storing instructions thereon, which, when executed by the processor, cause the AR device to perform operations comprising: obtaining, by the AR device, a plurality of keyframes, each keyframe comprising at least an image linked to an instance of pose data, wherein the pose data comprises spatial data in three dimensions (X, Y, and Z) derived from the spatial sensing system, and orientation data in three dimensions obtained from the orientation sensing system; quantizing, for each keyframe, the pose data according to predefined quantization parameters to generate quantized pose data, wherein the quantized pose data includes, quantized spatial indices and quantized orientation components; analyzing the quantized pose data of the keyframes to determine that a number of keyframes having identical quantized spatial indices in all three dimensions and matching quantized orientation components exceeds a predetermined threshold; and pruning the number of keyframes by deleting from memory at least one keyframe from the number of keyframes when the predetermined threshold is exceeded.

In Example 9, the subject matter of Example 8 includes, wherein the quantization parameters include at least a first quantization parameter for the spatial data and at least a second quantization parameter for the orientation data, the first quantization parameter for the spatial data defining a spatial grid size segmenting space in the three dimensions into a plurality of discrete spatial cells of a specified size, and the second quantization parameter for the orientation data defining angular grid cell sizes that segment the orientation space into a plurality of discrete orientation cells.

In Example 10, the subject matter of Examples 8-9 includes, wherein the spatial sensing system comprises at least one sensor selected from the group consisting of accelerometers, gyroscopes, magnetometers, and Global Positioning System (GPS) receivers, and wherein the spatial data is derived from measurements obtained from any combination of one or more of the selected sensors.

In Example 11, the subject matter of Examples 8-10 includes, wherein the orientation sensing system comprises at least one sensor selected from the group consisting of gyroscopes, magnetometers, and inertial measurement units (IMUs), and wherein the orientation data is derived from measurements obtained from any combination of one or more of the selected sensors.

In Example 12, the subject matter of Examples 8-11 includes, wherein pruning the number of keyframes when the predetermined threshold is exceeded further comprises selecting at least one keyframe for removal based on criteria comprising image clarity, feature richness of the image linked to the pose data, and temporal proximity of a timestamp of the keyframe to other keyframes, wherein keyframes with lower image clarity, lesser feature richness, or closer timestamp proximity to other keyframes are prioritized for removal.

In Example 13, the subject matter of Examples 8-12 includes, dynamically adjusting the quantization parameters based on factors including, but not limited to, the variability of spatial features, the rate of change in orientation data, and the diversity of lighting conditions, and wherein the adjustment of the quantization parameters is performed to balance the granularity of the quantized pose data with the computational load and memory usage of the AR device.

In Example 14, the subject matter of Examples 8-13 includes, wherein quantizing the pose data further comprises: incorporating lighting conditions as an additional dimension in the quantization process, wherein the lighting conditions are quantified based on a metric that characterizes the illumination of the environment, and wherein the quantized pose data includes a lighting condition index that distinguishes keyframes based on the quantified lighting conditions.

Example 15 is a computer-readable medium storing instructions thereon, which, when executed by one or more processors of an augmented reality (AR) device, cause the AR device to perform operations comprising: obtaining, by the AR device, a plurality of keyframes, each keyframe comprising at least an image linked to an instance of pose data, wherein the pose data comprises spatial data in three dimensions (X, Y, and Z) derived from one or more spatial sensing systems, and orientation data in three dimensions obtained from one or more orientation sensing systems; quantizing, for each keyframe, the pose data according to predefined quantization parameters to generate quantized pose data, wherein the quantized pose data includes, quantized spatial indices and quantized orientation components; analyzing the quantized pose data of the keyframes to determine that a number of keyframes having identical quantized spatial indices in all three dimensions and matching quantized orientation components exceeds a predetermined threshold; and pruning the number of keyframes by deleting from memory at least one keyframe from the number of keyframes when the predetermined threshold is exceeded.

In Example 16, the subject matter of Example 15 includes, wherein the quantization parameters include at least a first quantization parameter for the spatial data and at least a second quantization parameter for the orientation data, the first quantization parameter for the spatial data defining a spatial grid size segmenting space in the three dimensions into a plurality of discrete spatial cells of a specified size, and the second quantization parameter for the orientation data defining angular grid cell sizes that segment the orientation space into a plurality of discrete orientation cells.

In Example 17, the subject matter of Examples 15-16 includes, wherein the spatial sensing system comprises at least one sensor selected from the group consisting of accelerometers, gyroscopes, magnetometers, and Global Positioning System (GPS) receivers, and wherein the spatial data is derived from measurements obtained from any combination of one or more of the selected sensors.

In Example 18, the subject matter of Examples 15-17 includes, wherein the orientation sensing system comprises at least one sensor selected from the group consisting of gyroscopes, magnetometers, and inertial measurement units (IMUs), and wherein the orientation data is derived from measurements obtained from any combination of one or more of the selected sensors.

In Example 19, the subject matter of Examples 15-18 includes, wherein pruning the number of keyframes when the predetermined threshold is exceeded further comprises selecting at least one keyframe for removal based on criteria comprising image clarity, feature richness of the image linked to the pose data, and temporal proximity of a time-stamp of the keyframe to other keyframes, wherein key-frames with lower image clarity, lesser feature richness, or closer timestamp proximity to other keyframes are priori-tized for removal.

In Example 20, the subject matter of Examples 15-19 includes, dynamically adjusting the quantization parameters based on the complexity of the environment as determined by the AR device, wherein the complexity is assessed based on factors including, but not limited to, the variability of spatial features, the rate of change in orientation data, and the diversity of lighting conditions, and wherein the adjust-ment of the quantization parameters is performed to balance the granularity of the quantized pose data with the compu-tational load and memory usage of the AR device.

Example 21 is at least one machine-readable medium including instructions that, when executed by processing circuitry, cause the processing circuitry to perform opera-tions to implement of any of Examples 1-20.

Example 22 is an apparatus comprising means to imple-ment of any of Examples 1-20.

Example 23 is a system to implement of any of Examples 1-20.

Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metro-politan area network (MAN), the Internet, a portion of the Internet, a portion of the Public Switched Telephone Net-work (PSTN), a plain old telephone service (POTS) net-work, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cel-lular or wireless coupling. In this example, the coupling may implement any of a variety of types of data transfer tech-nology, such as Single Carrier Radio Transmission Technol-ogy (1×RTT), Evolution-Data Optimized (EVDO) technol-ogy, General Packet Radio Service (GPRS) technology, Enhanced Data rates for GSM Evolution (EDGE) technol-ogy, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organi-zations, other long-range protocols, or other data transfer technology.

"Component" refers, for example, to a device, physical entity, or logic having boundaries defined by function or subroutine calls, branch points, APIs, or other technologies that provide for the partitioning or modularization of par-ticular processing or control functions. Components may be combined via their interfaces with other components to carry out a machine process. A component may be a packaged functional hardware unit designed for use with other com-ponents and a part of a program that usually performs a particular function of related functions. Components may constitute either software components (e.g., code embodied on a machine-readable medium) or hardware components. A "hardware component" is a tangible unit capable of per-forming certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware compo-nent may also be implemented mechanically, electronically, or any suitable combination thereof. For example, a hard-ware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or cir-cuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedi-cated and permanently configured circuitry, or in temporar-ily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

"Pose Data" refers to data pertaining to the position and orientation of the AR or mixed-reality device within the environment. It is typically represented by spatial coordinates (X, Y, Z) and orientation angles (yaw, pitch, roll), which define the device's location and attitude in three-dimensional space. Pose data is crucial for understanding how the device is situated in relation to the environment it is mapping.

"Keyframe Data" (or, Keyframe) is a broader term than pose data and includes pose data along with additional information captured at specific instances during the SLAM process. A keyframe is essentially a snapshot of the environment at a particular moment in time, which includes the pose of the device when the data was captured as well as visual and sensor data, such as images from the camera systems and readings from motion sensors. Keyframes serve as reference points in the SLAM algorithm, helping to build and refine the map of the environment.

"Spatial Sensing System" refers to the collection of sensors and associated processing capabilities that gather and interpret data related to the physical location and movement of the AR device within a three-dimensional space. This system typically includes, but is not limited to, accelerometers, gyroscopes, magnetometers, Global Positioning System (GPS) receivers, and camera systems. These sensors, including the cameras, collectively provide critical data points such as acceleration, angular velocity, magnetic orientation, absolute position coordinates, and visual cues from the environment. Cameras, in particular, contribute by capturing sequential images that can be analyzed to derive positional data through techniques such as visual odometry or feature tracking. This data is essential for accurately determining the device's spatial orientation and trajectory.

"Orientation Sensing System" specifically pertains to the subset of sensors and computational methods used to ascertain the device's orientation relative to a reference frame. This system primarily utilizes gyroscopes, magnetometers, and camera systems, which can also provide orientation data by analyzing the changes in the visual field across frames. These orientation measurements, derived from both inertial sensors and visual data, are crucial for maintaining the correct perspective and alignment of augmented content in relation to the user's viewpoint and the surrounding environment. Together, these systems play pivotal roles in enabling precise localization and mapping functionalities critical for the effective operation of AR technologies.

What is claimed is:

1. A method for managing keyframe data in a Simultaneous Localization and Mapping (SLAM) system of an Augmented Reality (AR) device, the method comprising: obtaining, by the AR device, a plurality of keyframes, each keyframe comprising at least an image linked to an instance of pose data, wherein the pose data comprises spatial data in three dimensions (X, Y, and Z) derived from one or more spatial sensing systems, and orientation data in three dimensions derived from data obtained from one or more orientation sensing systems; quantizing, for each keyframe, the pose data according to predefined quantization parameters to generate quantized pose data, wherein the quantized pose data includes quantized spatial indices and quantized orientation components; analyzing the quantized pose data of the keyframes to determine that a number of keyframes having identical quantized spatial indices in all three dimensions and matching quantized orientation components exceeds a predetermined threshold; and pruning the number of keyframes by deleting from memory at least one keyframe from the number of keyframes when the predetermined threshold is exceeded.

2. The method of claim 1, wherein the quantization parameters include at least a first quantization parameter for the spatial data and at least a second quantization parameter for the orientation data, the first quantization parameter for the spatial data defining a spatial grid size segmenting space in the three dimensions into a plurality of discrete spatial cells of a specified size, and the second quantization parameter for the orientation data defining angular grid cell sizes that segment the orientation space into a plurality of discrete orientation cells.

3. The method of claim 1, wherein the spatial sensing system comprises at least one sensor selected from the group consisting of accelerometers, gyroscopes, magnetometers, Global Positioning System (GPS) receivers, and camera systems, and wherein the spatial data is derived from measurements obtained from any combination of one or more of the selected sensors, including image data from a camera system.

4. The method of claim 1, wherein the orientation sensing system comprises at least one sensor selected from the group consisting of gyroscopes, magnetometers, inertial measurement units (IMUs), and camera systems, and wherein the orientation data is derived from measurements obtained from any combination of one or more of the selected sensors, including image data from the camera systems.

5. The method of claim 1, wherein pruning the number of keyframes when the predetermined threshold is exceeded further comprises selecting at least one keyframe for removal based on criteria comprising image clarity, feature richness of the image linked to the pose data, and temporal proximity of a timestamp of the keyframe to other keyframes, wherein keyframes with lower image clarity, lesser feature richness, or closer timestamp proximity to other keyframes are prioritized for removal.

6. The method of claim 1, further comprising: dynamically adjusting the quantization parameters based on factors comprising a variability of spatial features, a rate of change in orientation data, and diversity of lighting conditions, and wherein the adjustment of the quantization parameters is performed to balance the granularity of the quantized pose data with a computational load and memory usage of the AR device.

7. The method of claim 1, wherein quantizing the pose data further comprises: incorporating lighting conditions as an additional dimension in the quantization process, wherein the lighting conditions are quantified based on a metric that characterizes the illumination of the environment, and wherein the quantized pose data includes a lighting condition index that distinguishes keyframes based on the quantified lighting conditions.

8. An augmented reality (AR) device configured to manage keyframe data in a Simultaneous Localization and Mapping (SLAM) system, the AR device comprising: a display; a processor; a spatial sensing system; an orientation sensing system; and a memory storing instructions thereon, which, when executed by the processor, cause the AR device to perform operations comprising: obtaining, by the AR device, a plurality of keyframes, each keyframe comprising at least an image linked to an instance of pose data, wherein the pose data comprises spatial data in three dimensions (X, Y, and Z) derived from the spatial sensing system, and orientation data in three dimensions obtained from the orientation sensing system; quantizing, for each keyframe, the pose data according to predefined quantization parameters to generate quantized pose data, wherein the quantized pose data includes quantized spatial indices and quantized orientation components; analyzing the quantized pose data of the keyframes to determine that a number of keyframes having identical quantized spatial indices in all three dimensions and matching quantized orientation components exceeds a predetermined threshold; and pruning the number of keyframes by deleting from memory at least one keyframe from the number of keyframes when the predetermined threshold is exceeded.

9. The AR device of claim 8, wherein the quantization parameters include at least a first quantization parameter for the spatial data and at least a second quantization parameter for the orientation data, the first quantization parameter for the spatial data defining a spatial grid size segmenting space in the three dimensions into a plurality of discrete spatial cells of a specified size, and the second quantization parameter for the orientation data defining angular grid cell sizes that segment the orientation space into a plurality of discrete orientation cells.

10. The AR device of claim 8, wherein the spatial sensing system comprises at least one sensor selected from the group consisting of accelerometers, gyroscopes, magnetometers, Global Positioning System (GPS) receivers, and camera systems, and wherein the spatial data is derived from measurements obtained from any combination of one or more of the selected sensors, including visual data from a camera system used to estimate the pose.

11. The AR device of claim 8, wherein the orientation sensing system comprises at least one sensor selected from the group consisting of gyroscopes, magnetometers, inertial measurement units (IMUs), and camera systems, and wherein the orientation data is derived from measurements obtained from any combination of one or more of the selected sensors, including image data from the camera systems.

12. The AR device of claim 8, wherein pruning the number of keyframes when the predetermined threshold is exceeded further comprises selecting at least one keyframe for removal based on criteria comprising image clarity, feature richness of the image linked to the pose data, and temporal proximity of a timestamp of the keyframe to other keyframes, wherein keyframes with lower image clarity, lesser feature richness, or closer timestamp proximity to other keyframes are prioritized for removal.

13. The AR device of claim 8, further comprising: dynamically adjusting the quantization parameters based on factors including, but not limited to, variability of spatial features, a rate of change in orientation data, and diversity of lighting conditions, and wherein the adjustment of the quantization parameters is performed to balance the granularity of the quantized pose data with the computational load and memory usage of the AR device.

14. The AR device of claim 8, wherein quantizing the pose data further comprises: incorporating lighting conditions as an additional dimension in the quantization process, wherein the lighting conditions are quantified based on a metric that characterizes the illumination of the environment, and wherein the quantized pose data includes a lighting condition index that distinguishes keyframes based on the quantified lighting conditions.

15. A non-transitory computer-readable medium storing instructions thereon, which, when executed by one or more processors of an augmented reality (AR) device, cause the AR device to perform operations comprising: obtaining, by the AR device, a plurality of keyframes, each keyframe comprising at least an image linked to an instance of pose data, wherein the pose data comprises spatial data in three dimensions (X, Y, and Z) derived from one or more spatial sensing systems, and orientation data in three dimensions obtained from one or more orientation sensing systems; quantizing, for each keyframe, the pose data according to predefined quantization parameters to generate quantized pose data, wherein the quantized pose data includes quantized spatial indices and quantized orientation components; analyzing the quantized pose data of the keyframes to determine that a number of keyframes having identical quantized spatial indices in all three dimensions and matching quantized orientation components exceeds a predetermined threshold; and pruning the number of keyframes by deleting from memory at least one keyframe from the number of keyframes when the predetermined threshold is exceeded.

16. The non-transitory computer-readable medium of claim 15, wherein the quantization parameters include at least a first quantization parameter for the spatial data and at least a second quantization parameter for the orientation data, the first quantization parameter for the spatial data defining a spatial grid size segmenting space in the three dimensions into a plurality of discrete spatial cells of a specified size, and the second quantization parameter for the orientation data defining angular grid cell sizes that segment the orientation space into a plurality of discrete orientation cells.

17. The non-transitory computer-readable medium of claim 15, wherein the spatial sensing system comprises at least one sensor selected from the group consisting of accelerometers, gyroscopes, magnetometers, Global Positioning System (GPS) receivers, and camera systems, and wherein the spatial data is derived from measurements obtained from any combination of one or more of the selected sensors, including visual data from a camera system used to estimate the pose.

18. The non-transitory computer-readable medium of claim 15, wherein the orientation sensing system comprises at least one sensor selected from the group consisting of gyroscopes, magnetometers, inertial measurement units (IMUs), and camera systems, and wherein the orientation data is derived from measurements obtained from any combination of one or more of the selected sensors, including image data from the camera systems.

19. The non-transitory computer-readable medium of claim 15, wherein pruning the number of keyframes when the predetermined threshold is exceeded further comprises selecting at least one keyframe for removal based on criteria comprising image clarity, feature richness of the image linked to the pose data, and temporal proximity of a timestamp of the keyframe to other keyframes, wherein keyframes with lower image clarity, lesser feature richness, or closer timestamp proximity to other keyframes are prioritized for removal.

20. The non-transitory computer-readable medium of claim 15, further comprising: dynamically adjusting the quantization parameters based on the complexity of the environment as determined by the AR device, wherein the complexity is assessed based on factors including, but not limited to, a measure of variability of spatial features, a rate of change in orientation data, a measure of diversity of lighting conditions, a degree of blur in captured images, and estimated co-variances in sensor data, herein the adjustment of the quantization parameters is performed to balance the granularity of the quantized pose data with the computational load and memory usage of the AR device.

* * * * *